US005167867A

United States Patent [19]

Quaife et al.

[11] Patent Number: 5,167,867

[45] Date of Patent: * Dec. 1, 1992

[54] TEST-FLUID COMPOSITION AND METHOD FOR DETECTING LEAKS IN PIPELINES AND ASSOCIATED FACILITIES

[75] Inventors: Leslie R. Quaife, Priddis; James Szarka, Calgary; Kelly J. Moynihan, Calgary; Michael E. Moir, Calgary, all of Canada

[73] Assignee: Exxon Production Research Company

[ * ] Notice: The portion of the term of this patent subsequent to Sep. 17, 2008 has been disclaimed.

[21] Appl. No.: 744,177

[22] Filed: Aug. 13, 1991

Related U.S. Application Data

[63] Continuation-in-part of Ser. No. 587,708, Sep. 25, 1990, Pat. No. 5,049,312.

[30] Foreign Application Priority Data

Sep. 26, 1989 [CA] Canada .................................. 613257

[51] Int. Cl.[5] ........................... C10L 5/00; C10J 1/00; C09K 5/00

[52] U.S. Cl. .................................. 252/408.1; 252/68; 44/639; 73/40.5 R; 73/40.7

[58] Field of Search ................ 252/68, 408.1; 73/40.7, 73/40.5 R; 44/639

[56] References Cited

U.S. PATENT DOCUMENTS

| | | | |
|---|---|---|---|
| 2,068,614 | 1/1937 | Thomas et al. | 48/195 |
| 3,169,839 | 2/1965 | Calva | 48/195 |
| 3,545,949 | 12/1970 | Oister | 252/68 |
| 3,634,053 | 1/1972 | Klass et al. | 211/104 |
| 3,826,631 | 7/1974 | Nevers | 44/52 |
| 4,025,315 | 5/1977 | Mazelli | 48/195 |
| 4,294,716 | 10/1981 | Saccavino et al. | 252/68 |
| 4,504,281 | 3/1985 | Williams, Jr. et al. | 44/639 |
| 4,546,649 | 10/1985 | Kantor | 73/168 |
| 5,049,312 | 9/1991 | Quaife et al. | 252/408.1 |

FOREIGN PATENT DOCUMENTS 2756655 6/1978 Fed. Rep. of Germany .

OTHER PUBLICATIONS

Parlman and Williams, "Penetrabilities of Gas Odorant Compounds in Natural Soils", 1979, pp. D-294-299, American Gas Association, Oper. Sect. Proc.

Howard, "The Ice-O-later: A Proven Way to Determine Pipeline Leaks", Feb., 1982, pp. 327-330, 10th International Pipeline Technology Conference.

Altpeter, Day, and Atallah, "New Developments in Odorization Practices", Part 1, Oct., 1983, pp. 29-32, Pipe Line Industry.

Altpeter, Day and Atallah, "New Developments in Odorization Practices", Part 2, Nov., 1983, pp. 67-72, Pipe Line Industry.

Williams, "Soil Penetrabilities of Natural Gas Odorants", Mar., 1976, pp. 33-46, Pipeline and Gas Journal.

Hale, "Today's Compounds Are Good; Better Testing, Expanded Use Needed: Odorization", Oct., 1984, pp. 38-46, Pipeline & Gas Journal.

Chisholm et al., "Study of the Properties of Numerous Odorants and Assessment of Their Effectiveness in Various Environmental Conditions to Alert People to the Presence of Natural Gas", Oct., 1975, pp. 22-26, NTIS U.S. Department of Commerce PB-249 528.

Arthur D. Little, Inc., "Development of New Gas Odorants", Dec., 1978, pp. 26-30, NTIS U.S. Department of Commerce PB 80-218811.

Kirk-Othmer Encyclopedia of Chemical Technology 3rd Edition, vol. 17, pp. 912-914, vol. 22, pp. 958-961.

Reuter News Service, "Canines Sniffing Out Tiny Leaks in Pipelines", Apr., 15, 1990, p. D6, Houston Post.

*Primary Examiner*—Richard D. Lovering
*Assistant Examiner*—N. Bhat

[57] ABSTRACT

A method of locating leaks in pipelines and associated facilities and a novel leak-detection test-fluid are disclosed. The novel test-fluid, comprising an odorant (preferably dimethylsulphide), a mutual solvent and water, is injected into a pipeline or facility so that the test-fluid escapes through the leak and an odorant which, by virtue of its chemical and physical properties, is released from other test-fluid components to be detected in the vicinity of the leak.

11 Claims, No Drawings

TEST-FLUID COMPOSITION AND METHOD FOR DETECTING LEAKS IN PIPELINES AND ASSOCIATED FACILITIES

CROSS-REFERENCE TO RELATED APPLICATIONS

This application is a continuation-in-part of co-pending U.S. Ser. No. 07/587,708 filed Sep. 25, 1990, now U.S. Pat. No. 5,049,312.

FIELD OF THE INVENTION

This invention relates to a method of locating leaks in pipelines and associated facilities. More particularly, this invention concerns a novel test-fluid useful in accurately locating such leaks.

BACKGROUND OF THE INVENTION

A major and ongoing problem for petroleum and chemical industries is the inability of present-day technology to precisely find leaks in transportation and storage facilities. The problem has two major components: the first challenge is to establish that a facility is in fact leaking; the second challenge relates to accurately locating the source of a leak. It is the second of these two issues that the present invention addresses.

More than thirty different techniques are known in the art for leak-detection. These methods can be grouped into several categories depending on the technology used. Some of these categories are systems based on: odorants, radioactive or chemical tracers, acoustic signals, dyes, smart pigs, electromagnetics, computer product mass-balance, hydrostatic testing, transient pressure-wave monitoring, reflectometry, thermal and infrared, and diffusion.

Although these conventional methodologies have enjoyed some degree of success in finding leaks, none has shown a capability to consistently and precisely locate pin-hole leaks, particularly in subsurface pipelines and associated facilities. In many cases, underground facilities are determined to be leaking only after material mass-balance has indicated that substantial loss of product has occurred, or when material escaping from a leak rises to the soil surface and is visually detected. In both cases, such lack of precision can result in appreciable pollution, as well as in high economic costs incurred through direct loss of product.

One strategy traditionally used to locate leaks in pipelines involves the addition of an odorant to a pipeline hydrostatic test-fluid, followed by attempts to detect the odorant at ground level. This technique has generally been unsuccessful for several reasons. Firstly, conventional instrumentation such as gas detectors ("sniffers") or gas chromatographs lack the sensitivity and/or field-portability required to detect the low concentrations of odorant which typically reach the surface. Secondly, and of critical importance, is that the mercaptan odorants usually employed in this technique are water-soluble, and migrate with the aqueous phase of the standard test-fluid, to give imprecise or erroneous locations for leaks. Even when such odorant-based techniques are partially "successful", their overall lack of precision may impose substantial economic penalties via the increased costs in equipment and manpower required to excavate over a generalized area to pinpoint the precise source of a leak.

Therefore, there exists an industry need for a leak-detection system capable of consistently and accurately locating leaks in underground, and/or above ground, facilities. The present invention constitutes a novel leak-detection test-fluid which has shown to be capable of very accurately locating leaks in either above-ground facilities, or in buried pipelines or associated facilities.

SUMMARY OF THE INVENTION

The present invention relates to a method of detecting leaks in pipelines and other structures and facilities and, more particularly, to a leak-detection test-fluid which can be used to accurately locate such leaks. In accordance with this invention, a process is provided for accurately detecting leaks in pipelines and associated facilities wherein a novel test-fluid is injected into a pipeline or facility so that the test-fluid escapes through said leak, and an odorant which, by virtue of its chemical and physical properties, is released from other test fluid components to be detected in the immediate vicinity of the leak site, irrespective of whether or not the leak is above or below the ground surface. A preferred embodiment of the novel test-fluid is comprised of a solution of dimethylsulphide, and a mutual solvent, and in some applications, water in varying ratios depending on ambient conditions (e.g. temperature) and according to specific technical requirements.

DETAILED DESCRIPTION OF THE INVENTION

The benefits and advantages that can be obtained in the practice of this invention are achieved through the use of the test-fluid, a preferred embodiment of which is composed of a solution of dimethylsulphide, a mutual solvent and, depending on the technical requirements, water.

This new, test-fluid-based procedure is distinguishable from other odorant-based leak-detection systems by a number of specific attributes. Firstly, unlike other odorant-based systems, this invention operates within the liquid-phase realm as opposed to the gaseous-phase realm. Secondly, the use of the new test-fluid allows for the precise location of very small, pin-hole leaks in either subsurface or above-ground facilities. In the new system, an odorant serves to precisely pinpoint the location of a leak, whereas in conventional gaseous-phase systems, odorants act within a safety context only to "inform" or warn operators that a potential hazard exists. The physical/chemical characteristics of the test-fluid components described below, combine to produce a product with unique properties which in turn enable the accurate location of very small leaks, even in structures buried to a depth of four meters or more.

Dimethylsulphide is known in the art as an odorant. It has a vapor pressure high enough to permit percolation from a leak in a buried structure, through the soil to the surface, without being appreciably absorbed by the soil. It has a strong identifiable odor, is relatively insoluble in water, is non-toxic in the concentrations used in this application, is readily available, and is relatively inexpensive.

In one embodiment of this invention, dimethylsulphide is combined with other fluids which act as carriers. The dimethylsulphide should remain dispersed throughout the test-fluid for the duration of the test to achieve the best results. The dimethylsulphide should therefore be at least partially soluble in the mutual solvent. Since dimethylsulphide is relatively insoluble in an aqueous medium, the mutual solvent prevents partitioning of the dimethylsulphide from other test-fluid constituents. Depending on certain other requirements, such as use of the test-fluid at ambient temperatures below the freezing point of water, the most appropriate mutual solvent, or combination of solvents is chosen. Suitable mutual solvents include alcohols and glycols. Methanol is the preferred mutual solvent.

The physical characteristics of dimethylsulphide assure that a detectable mixture of test-fluid components can rise above a leak and be detected in the immediate vicinity of the leak, whether the leak is above or below-ground. These characteristics overcome problems traditionally plaguing other odorant-based, leak-detection techniquies using odorants such as mercaptans. Being more water-soluble, mercaptans tend to remain in solution, migrating away from a leak site in the aqueous phase of a test-fluid. This higher water-solubility of mercaptans severely limits the precision with which mercaptan-based leak-detection systems can locate leaks because the aqueous phase in which the odorants are soluble can disperse over a very wide area.

According to the present invention, leaks in pipelines and associated facilities are detected by injecting the test fluid into a pipeline or facility and then detecting the odiferous component (preferably dimethylsulphide) of the test-fluid in the immediate vicinity of the leak. In one embodiment of the invention, the test-fluid may be passed through a pipeline or facility as a batch-loaded slug or as a slug loaded within a pig-train. During this procedure, the pipeline or facility may remain in service or may be temporarily taken out of service while the leak test is being conducted. In another embodiment, the pipeline or facility is shut down and filled entirely or in part with the test-fluid. In a third embodiment that is preferred for use in pipelines transporting gas or LPG, the test fluid is injected directly into the gas stream. DMS may also be injected directly into the gas stream without the other test-fluid components. The method of injection can vary, although the preferred method is to inject the test-fluid or DMS using conventional pumps such as those used for mercaptan-odorization of natural gas. The advantage to using this embodiment is that any "down-time" of the pipeline or facility being tested is minimized and leak-location may be conducted while the line remains in service.

Any suitable means of detecting the test-fluid or its components near the leak site may be utilized, including gas chromotography, and animal or human olfaction. Presently, the preferred detection technique is to use dogs (*Canis familiaris*) which have been trained to search for the odorant and to indicate by using specific behavior patterns where they have found the highest concentration of the odorant.

One embodiment of the novel test-fluid contains dimethylsulphide in the range of about 0.1 to about 15 volume percent. Preferably, the composition contains dimethylsulphide in the range of about 0.1 to about 7.0 volume percent, and most preferably in the range of about 0.1 to about 0.3 volume percent. The test-fluid also contains a solvent in the range of about 0.7 to about 99.9 volume percent and preferably in the range of about 0.7 to about 50 volume percent. The test-fluid can also contain water in the range of about 50 to about 85 volume percent. When the test fluid is injected into a gas stream, however, very low concentrations of mutual solvent and water should be used. In specific applications of the technology, additional test-fluid components may be introduced to counteract factors acting to inhibit the performance of the test-fluid, or which might act to damage the pipeline or associated facility. Such additives might include bacteriocides, oxygen scavengers, and inhibitors. It is important to note that the success of this test-fluid in precisely locating leaks is critically dependent on the combination of physical/chemical attributes contributed to the overall test-fluid by its various components. Factors such as precision, cost-effectiveness, and temperature-stability may be compromised if test-fluid composition is changed.

Other odorants believed to be suitable in the test fluid composition because of the similarity of their physical and chemical properties to DMS include dimethyl disulphide, thio phenols, xanthate esters, thiophenes, sulphides and thio esters. A mixture of DMS and N-butyl mercaptan is also believed to be suitable. The mixture apparently produces a synergistically stronger odor. One of ordinary skill can easily determine concentration ranges for the above listed odorants in the test-fluid composition.

In order to illustrate the benefits of the invention, tests were conducted both in the laboratory and in pipelines and associated facilities. After confirmation from laboratory tests that the test-fluid odorant would percolate through a soil column, a first set of field trials was conducted at a site using five constructed leaks in buried pipelines. Four pipeline leaks were used to test detectability by trained dogs and all four leaks were detected by the dogs. The fifth leak was plugged and the dogs confirmed that no leaking occurred at that location. A second set of field trails was conducted at a different location with four constructed leaks in buried pipelines. All four leaks were detected by dogs including one located twelve feet (3.66 m) below the surface. The invention was then used to detect actual leaks at two different facilities. At the first facility, a pin-hole leak was detected and pinpointed by dogs in a ten-year-old, 3 km (2 mi), 2200 psi (15,169 Kpa) produced-water line buried in clay to a depth of seven feet (2.14 m). At the second facility, dogs detected one major leak, a minor leak and two leaking valves. The major leak was approximately 0.5 cm (0.19 in.) in diameter in a 28-year-old glycol line buried to 1.2 meters (3.94 ft.). Detection of this leak prevented imminent rupture of an adjacent sour gas line affected by the leak.

A field test was also conducted to demonstrate another embodiment of this invention wherein a slug of test fluid is injected in a pipeline in a pig-train. Dogs detected a constructed leak 0.125 inches (0.3 cm) in diameter in an 18 inch (46 cm) diameter, 7 km (4.2 mi) long pipeline.

The preferred embodiments of the present invention have been described above. It should be understood that the foregoing description is intended only to illustrate certain embodiments of the invention and is not intended to define the invention in any way. Other embodiments of the invention can be employed without departing from the full scope of the invention as set forth in the appended claims.

We claim:

1. A test-fluid composition for accurately locating leaks in pipelines and associated facilities comprising:

(a) an odorant selected from the group consisting of thio phenols, xanthate esters, thiophenes, sulphides and thio esters;

(b) a mutual solvent; and (c) water wherein said odorant, by virtue of its chemical and physical properties, is released from the test-fluid composition to be detected at a location in the immediate vicinity of said leak.

2. A composition in accordance with claim 1 wherein said mutual solvent comprises from about 0.7 to about 99.9 volume percent of said composition.

3. A composition in accordance with claim 1 wherein said mutual solvent comprises from about 0.7 to about 50 volume percent of said composition.

4. A test fluid composition for accurately locating leaks in pipelines and associated facilities comprising:

(a) an odorant selected from the group consisting of dimethyl disulphide and a mixture of dimethyl sulphide and N-butyl mercaptan;

(b) a mutual solvent; and (c) water wherein said odorant, by virtue of its chemical and physical properties, is released from the test-fluid composition to be detected at a location in the immediate vicinity of said leak.

5. A composition in accordance with claim 4 wherein said mutual solvent comprises from about 0.7 to about 99.9 volume percent of said composition.

6. A composition in accordance with claim 4 wherein said mutual solvent comprises from about 0.7 to about 50 volume percent of said composition.

7. A method for accurately locating leaks in pipelines and associated facilities which comprises:

(a) injecting a test-fluid comprising an odorant, a mutual solvent and water into said pipeline such that said test-fluid escapes through said leaks and said odorant is released from said test-fluid; and (b) detecting said odorant at a location in the immediate vicinity of said leaks.

8. A method in accordance with claim 7 wherein said test-fluid is injected directly into a gas pipeline stream.

9. A method in accordance with claim 7 wherein said odorant is detected by dog olfaction.

10. A method for accurately locating leaks in pipelines and associated facilities which comprises:

(a) injecting an odorant comprising dimethyl sulphide into said pipeline; and (b) detecting said odorant at a location in the immediate vicinity of said leaks by dog olfaction.

11. A method in accordance with claim 10 wherein said odorant is injected directly into a gas pipeline stream.

* * * * *